Aug. 21, 1951 L. KINTER 2,565,237
STAIR HAND CART
Filed July 21, 1947
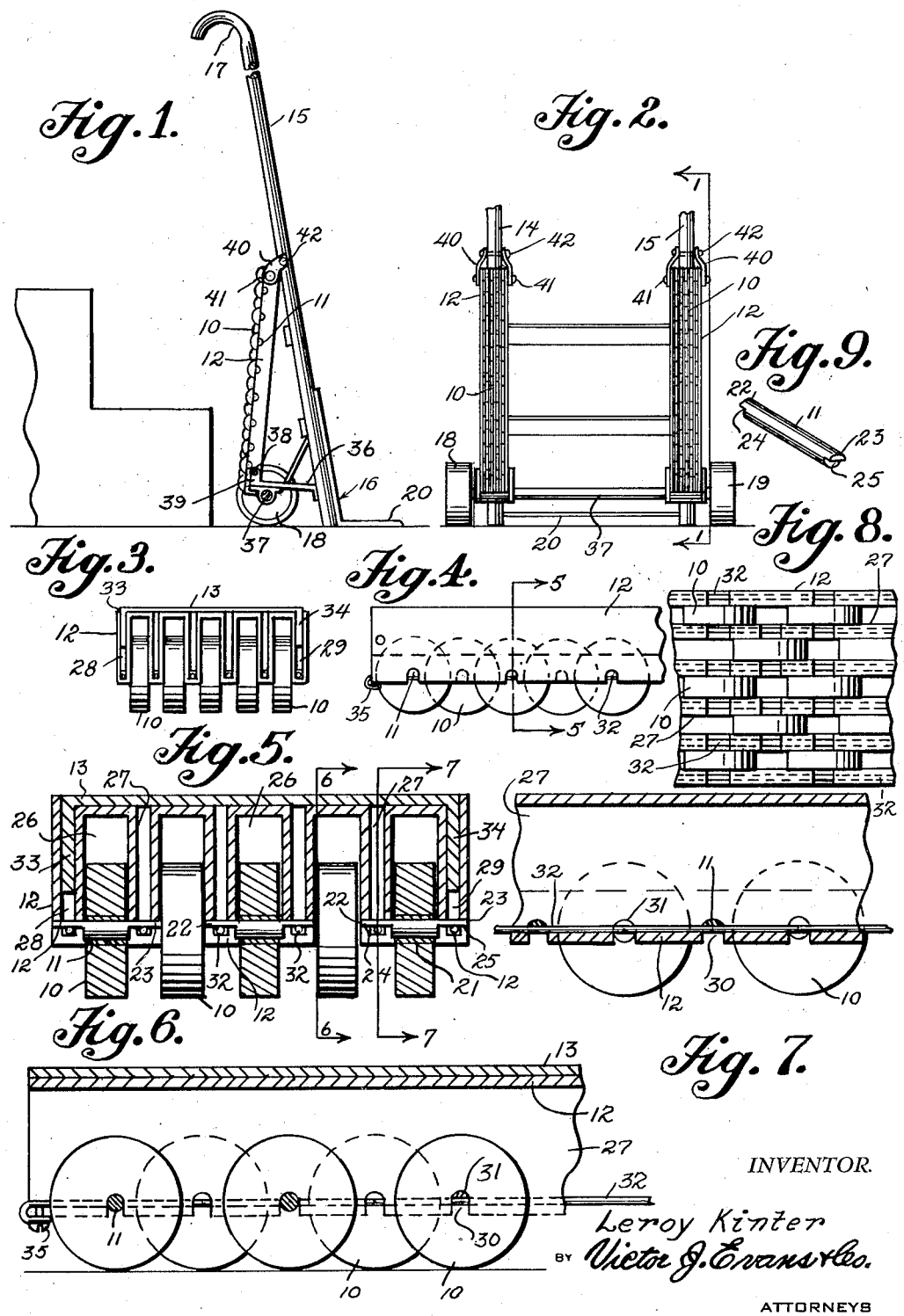

Patented Aug. 21, 1951

2,565,237

UNITED STATES PATENT OFFICE 2,565,237

STAIR HAND CART

Leroy Kinter, Grafton, W. Va.

Application July 21, 1947, Serial No. 762,461

2 Claims. (Cl. 280—5.24)

This invention relates to hand trucks and carts of the type having a frame with side beams having handles at the upper end and rollers in combination with a cargo carrying blade at the lower end, and in particular a truck of this type wherein rollers are provided under the side beams to facilitate drawing the truck up stairways and the like.

The purpose of this invention is to provide a hand parcel or cargo carrying truck or cart for use in trucking up and down stairs which travels over the corners of the steps with an easy movement and without damaging the treads of the stairs.

Various types of hand trucks have been provided for carrying cargo up and down stairs for household and warehouse use, but the most common of these use shoes that slide over the steps, and where rollers are used they are spaced so that a continuous rolling action is substantially impossible, and trucks of these types damage the stairs. With this thought in mind this invention contemplates a hand truck with a plurality of rows of staggered rollers under each side beam wherein a continuous rolling action is obtained so that the truck rides over the corners of the steps with an easy movement.

The object of this invention is to provide a method of mounting conveyor-like rollers on the back of a hand truck to facilitate operating the truck up and down steps.

Another object of the invention is to provide a method of mounting a plurality of comparatively small rollers in channel shaped elements that may readily be attached to side beams of hand trucks so that the rollers provide a substantially continuous rolling surface.

A further object of the invention is to provide tracks of freely rotatable rollers adapted to be attached to the rear of side beams of hand trucks which are of a comparatively simple and economical construction.

With these and other objects in view the invention embodies supporting frames having parallel longitudinally extending channels, rollers mounted in staggered relation in said channels, and means mounting the said supporting frames on a hand truck or the like.

Other features and advantages of the invention will appear from the following description taken in connection with the drawings, wherein:

Figure 1 is a view taken on line 1—1 of Figure 2 illustrating a hand truck with rollers behind the side beams thereof showing the relative positions of the elements and the relation thereof with steps, and with the truck roller on the near side omitted.

Figure 2 is a view showing a rear elevation of the truck shown in Figure 1, with the upper part thereof broken away.

Figure 3 is a detail showing an end elevation of one of the roller tracks.

Figure 4 is a view showing a side elevation of one end of a roller track with part broken away.

Figure 5 is a cross section through the roller track taken on line 5—5 of Figure 4, showing the parts on an enlarged scale.

Figure 6 is a longitudinal section through the track also on an enlarged scale, taken on line 6—6 of Figure 5.

Figure 7 is a similar section also on an enlarged scale, taken on line 7—7 of Figure 5, and with parts broken away.

Figure 8 is a plan view of the roller track looking toward the under side thereof and with parts broken away.

Figure 9 is a detail illustrating a small shaft used to rotatably mount the rollers in the supporting frame.

Referring now to the drawings wherein like reference characters indicate corresponding parts, the stair hand truck of this invention includes a plurality of rollers 10 rotatably mounted on shafts 11 in a supporting L-shaped bracket or frame 12, and the frame is reinforced by a channel 13 which is mounted on the side beams 14 and 15 of a hand truck or cart 16 having handles 17 at the upper end, and wheels 18 and 19 and a pick-up blade 20, at the lower end.

The rollers 10 are preferably provided with bushings 21 through which they are mounted on the central portions of the shafts 11, and the ends 22 and 23 of the shafts are provided with flat sides 24 and 25 as shown in Figure 9.

The supporting frames 12 are formed with a series of roller carrying channels 26 separated by double wall bearing holding intermediate webs 27 with similarly shaped end sections 28 and 29, and the webs and end sections are provided with recesses or notches 30 having arcuate inner ends 31 in which the ends 22 and 23 of the shafts 11 are held by rods 32 as shown in Figures 5 and 7. As illustrated in Figure 8, the recesses are spaced at intervals in the intermediate webs 27 and provided only at every other point in the side sections 28 and 29. The channel 13 is formed with side flanges 33 and 34 that extend into slots in the side sections 28 and 29 of the frame 12 as shown in Figure 5, and the webs 27 of the frames are nested in the channel between the flanges thereof, as illustrated in Figure 5.

The ends of the rods 32 are formed as illustrated in Figure 6 in which they are bent under the lower surface of the frame 12 and secured by screws 35 as shown.

The supporting frame 12 and channel 13 form a track in which the rollers are mounted and the lower end of the track at each side of the truck is mounted on a bracket 36 on which an axle 37 of the wheels 18 and 19 is also mounted. The track is held by bolts 38 in extensions 39 from the brackets, at the lower end, and by brackets 40 with bolts 41 and 42 at the upper end. It will be understood that the track with the rollers may be mounted on the truck in any manner or by any means.

With the parts arranged in this manner the rollers 10 may be assembled on the shafts 11 and the ends of the shafts dropped into the notches in the edges of the intermediate webs and side sections, as shown in Figure 8, and the rods 32 may then be slid through the closed lower edges of the sides of the channels to secure the shafts in place. The tracks may then be attached to the trucks as described.

It will be understood that changes may be made in the design or arrangement of the parts without departing from the spirit of the invention.

What is claimed is:

1. In a stair hand truck, the combination which comprises a pair of spaced side beams connected by cross bars and having handles on the upper ends with a pick up blade extended from and connecting the lower ends, L-shaped brackets having long and short arms attached to and extended rearwardly from the said side beams, an axle journaled on the short arms of the brackets, wheels mounted on the ends of the axle, the long arms of said brackets including spaced parallel U-shaped channels having closed side webs with shaft carrying notches therein, longitudinally spaced shafts having flat ends mounted in the notches in the sides webs of the channels, rollers journaled on the shafts and positioned with parts thereof extended upwardly into the said channels, said shafts positioned whereby the rollers of one channel are staggered in relation to the rollers of juxta-positioned channels, and longitudinally extended rods positioned against the flat ends of the shafts and extended through the sides of the channels for retaining the said shafts in operative positions in the sides of the channels.

2. A bracket for a stair hand truck having side beams comprising an L-shaped bracket having long and short arms attached to and extended rearwardly from the said side beams of the truck, an axle journaled on the short arm of the bracket, wheels on the axle, the long arm of said bracket including spaced parallel U-shaped channels having closed side webs with shaft carrying notches therein, longitudinally spaced shafts having flat ends mounted in the notches in the side webs of the channels, rollers journaled on the shafts and positioned with parts thereof extended upwardly into the said channels, said channels positioned whereby the rollers of one channel are staggered in relation to the rollers of juxta-positioned channels, and longitudinally extended rods positioned against the flat ends of the shafts and extended through the closed side web of the channels for retaining the said shafts in operative positions in the sides of the channels.

LEROY KINTER.

REFERENCES CITED

The following references are of record in the file of this patent:

UNITED STATES PATENTS

| Number | Name | Date |
| --- | --- | --- |
| 73,398 | Smith | Jan. 14, 1868 |
| 787,472 | Schuster et al. | Apr. 18, 1905 |
| 887,821 | Lang | May 19, 1908 |
| 1,028,589 | Moore | June 4, 1912 |
| 1,580,367 | Beulke | Apr. 13, 1926 |
| 2,391,272 | Rose | Dec. 18, 1945 |

FOREIGN PATENTS

| Number | Country | Date |
| --- | --- | --- |
| 70,347 | Sweden | Dec. 17, 1929 |